(12) United States Patent
Maurer et al.

(10) Patent No.: US 11,281,474 B2
(45) Date of Patent: Mar. 22, 2022

(54) PARTIAL COMPUTER PROCESSOR CORE SHUTOFF

(71) Applicant: International Business Machines Corporation, Armonk, NY (US)

(72) Inventors: Thilo Maurer, Stuttgart (DE); Markus Buehler, Schoenbuch (DE); Arni Ingimundarson, Karlsruhe (DE); Burkhard Steinmacher-Burow, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/836,070

(22) Filed: Mar. 31, 2020

(65) Prior Publication Data

US 2021/0303313 A1 Sep. 30, 2021

(51) Int. Cl.
G06F 9/54 (2006.01)
G06F 9/4401 (2018.01)
G06F 11/34 (2006.01)

(52) U.S. Cl.
CPC .......... G06F 9/442 (2013.01); G06F 11/3409 (2013.01)

(58) Field of Classification Search
CPC .... G06F 1/3203; G06F 1/3287; G06F 9/4443; G06F 9/45512; Y02B 60/1217
USPC .................. 713/320, 324; 719/320
See application file for complete search history.

(56) References Cited

U.S. PATENT DOCUMENTS

| 7,536,229 | B2 * | 5/2009 | Ichikawa | G06F 9/5088 |
| | | | | 700/2 |
| 7,549,075 | B2 * | 6/2009 | He | G06F 1/3203 |
| | | | | 713/600 |
| 8,924,756 | B2 | 12/2014 | Kaburlasos | |
| 9,086,876 | B2 * | 7/2015 | Gustaffson | G06F 1/3203 |
| 9,483,324 | B2 * | 11/2016 | Miyamoto | G06F 9/52 |

(Continued)

FOREIGN PATENT DOCUMENTS

| CN | 101458555 A | 6/2009 |
| CN | 102968352 A | 3/2013 |

(Continued)

OTHER PUBLICATIONS

International Search Report and Written Opinion, International Application No. PCT/IB2021/051503, International Filing Date Feb. 23, 2021, 6 pages.

(Continued)

*Primary Examiner* — Andy Ho
(74) *Attorney, Agent, or Firm* — Michael A. Petrocelli

(57) ABSTRACT

Aspects of the disclosure relate to a processor core including an execution unit and a usage ratio controller. The execution unit is operable for executing a command forwarded to the execution unit. The usage ratio controller is operatively coupled with the execution unit. The usage ratio controller is operable for controlling a usage ratio of the execution unit. The usage ratio corresponds to the fraction of an observation time during which the execution unit is executing commands of an application. Other aspects of the disclosure relate to a method for detecting or analyzing a bottleneck in a processor core for a given application. The method includes controlling a usage ratio of at least one execution unit of the processor core and measuring the resulting application performance.

15 Claims, 5 Drawing Sheets

(56) References Cited

U.S. PATENT DOCUMENTS

| | | | |
|---|---|---|---|
| 9,495,001 B2 | 11/2016 | Varma | |
| 9,766,685 B2 | 9/2017 | Keppel | |
| 10,606,338 B2 * | 3/2020 | Nair | G06F 1/26 |
| 2015/0355705 A1 | 12/2015 | Weissmann | |

FOREIGN PATENT DOCUMENTS

| | | |
|---|---|---|
| CN | 107526646 A | 12/2017 |
| WO | 2017016074 A1 | 2/2017 |

OTHER PUBLICATIONS

Maurer, et al., "Partial Computer Processor Core Shutoff", International Application No. PCT/IB2021/051503, International Filing Date Feb. 23, 2021, 26 pages.
"Hardware Duty Cycling (HDC)", Power and Thermal Management, vol. 3B 14-13, p. 479, <https://xem.github.io/minix86/manual/intel-x86-and-64-manual-vol3/o_fe12b1e2a880e0ce-479.html>.

* cited by examiner

PARTIAL COMPUTER PROCESSOR CORE SHUTOFF

BACKGROUND

The present invention generally relates to computer systems and, more particularly, to processor cores.

Application performance improvements have been to a large extent the result of increased hardware performance. With structure sizes reaching not only technological and economical but also fundamental physical limits, comparable performance gains attributed to hardware development are no longer to be expected.

However, potential remains for optimizing software. For example, the software algorithms themselves may be improved. Perhaps even more promising is hardware aware tuning of the software. Heretofore, it may be desirable to have knowledge of the hardware units actually limiting the application performance, i.e. which hardware unit represents the bottleneck of a given application. For example, the memory unit may represent a bottleneck of the application while the calculation units are under-utilized. Then, it may be possible to adapt the software to make less use of the memory unit but more use of the calculation unit. Alternatively, or in addition, knowledge of the bottleneck may allow for developing future hardware being more adapted to application needs. Therefore, methods and systems for improved processor cores may be desirable.

SUMMARY

Aspects of the disclosure relate to a processor core including at least one execution unit and a usage ratio controller. The execution unit is operable for executing a command forwarded to the execution unit. The usage ratio controller is operatively coupled with the execution unit. The usage ratio controller is operable for controlling the usage ratio of the execution unit. This corresponds to the fraction of the total execution time during which the execution unit is executing commands.

Other aspects of the disclosure relate to a method for detecting or analyzing a bottleneck in a processor core for a given application. The execution of a given application corresponds to a given set of commands to be executed by the execution units of a processor core. The method includes controlling the usage ratio of at least one execution unit of the processor core and measuring the resulting application performance.

The above summary is not intended to describe each illustrated embodiment or every implementation of the present disclosure.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention generally relates to the field of computer systems, and more particularly to processor cores. The following described exemplary embodiments provide a system, method, and computer program product to, among other things, using a duty cycle controller to measure performance and performance limitations in a processor core. Therefore, the present embodiments have the capacity to improve the technical field of computer systems by providing a way of identifying a bottleneck of a given application based on determining critical components of the system, the need for more units in the system, and the identification of under-utilized units in the system, among other parameters. Specifically, embodiments of the present disclosure may control the usage ratios of a plurality of execution units and determine an application performance dependency on the respective usage ratios which may allow the identification of a bottleneck of the processor core limiting the performance of an application.

Figure 1:
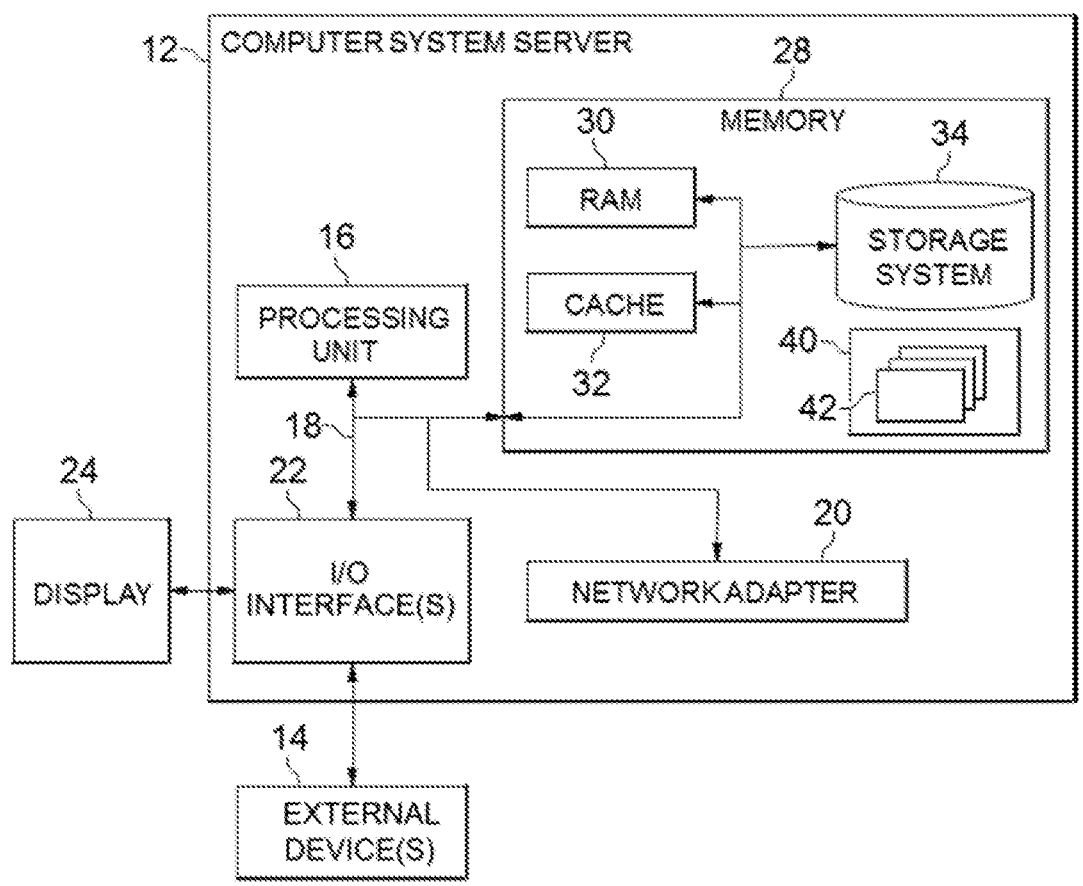
FIG. 1 is an exemplary computer system, according to an embodiment of the present disclosure.

Referring now to FIG. 1, an exemplary computer system/server 12 which is applicable to implement the embodiments of the present disclosure is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, etc.

It should be noted that embodiments of the present disclosure may be implemented as the program/utility 40 or the program modules 42 of FIG. 1.

Figure 2:
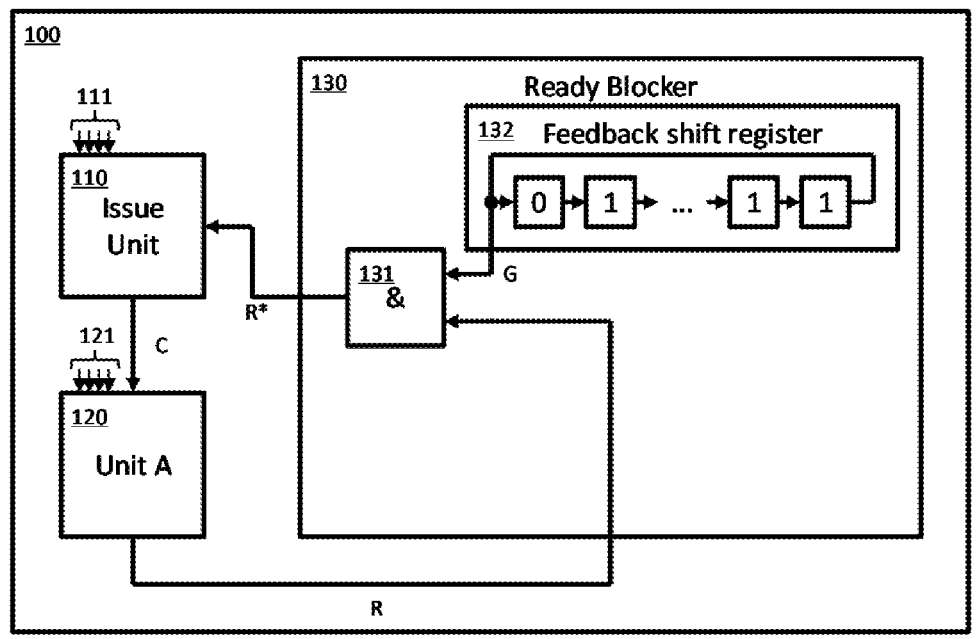
FIG. 2 depicts a first exemplary processor core, according to an embodiment of the present disclosure.

Referring now to FIG. 2, a first exemplary processor core 100 is shown, according to an embodiment of the present disclosure. The first exemplary processor core 100 includes an execution unit 120 which is operable for executing a command. In the example of FIG. 2, the execution unit 120 is also denoted as Unit A. The first exemplary processor core 100 may include more than one execution unit 120. For example, the first exemplary processor core 100 may additionally include a Unit B, a Unit C, etc. (not shown in the figure). In addition to an input for receiving a command C, which may also be called issue command, to start computing, the execution unit 120 may include further inputs 121. For example, the further inputs 121 may be used to receive data to be manipulated by the execution unit 120. It should be noted that execution of a given application corresponds to a given set of commands to be executed by the execution units of a processor core.

Furthermore, the first exemplary processor core 100 includes one or more usage ratio controller 130. The usage ratio controller 130 may also be called Ready Blocker. Each usage ratio controller 130 is operatively coupled with one or more execution units 120. Each usage ratio controller 130 may be operable for controlling the usage ratio of its coupled execution units 120. As known by those skilled in the art, an execution unit of a processor core may only be active for a time $t_A$ of an observation period T. The ratio $t_A/T$ is called usage ratio.

The execution unit 120 may transmit a ready signal R indicating that the preceding computation has been performed and that the execution unit 120 is ready for executing the next computation. The usage ratio controller 130 is operable for generating a modified ready signal R* from the ready signal R, as shown in the figure.

The first exemplary processor core 100 may further include an issue unit 110 operable for forwarding the next command C triggering the execution unit to start computing based on the modified ready signal R*. The issue unit 110 may include further inputs 111 through which further signals may have to be received before the issue unit 110 issues the command C.

The usage ratio controller 130 may mask the ready signal R a certain percentage of the time. Accordingly, the modified ready signal R* may be transmitted to the issue unit 110 not every time the usage ratio controller 130 receives the ready signal R from execution unit 120. Thus, the usage ratio of execution unit 120 may be modified, in particular, decreased. The ready signal R and/or the modified ready signal R* may correspond to a static voltage (i.e., high or low) on a static electrical connection between the corresponding units. However, it may also be possible to transmit the ready signal R and the modified ready signal R* as messages on a bus.

The individual modification of the usage ratio of the individual execution unit may allow for a more detailed analysis of a bottleneck limiting the given application's performance, compared to reducing the operating frequency of the processor core. Side effects known from known methods for analyzing the hardware influence on application performance may be avoided. For example, a reduction of an operating frequency of the processor core may not only reduce the usage ratio of the execution units but may also influence the electric behavior of the processor core, i.e. voltages, currents, capacitances. Moreover, the techniques proposed in this application may provide a finer granularity compared to traditional methods for influencing the hardware performance. For example, the proposed method and associated system may provide a finer granularity than simply using more or fewer cores per socket. Furthermore, the proposed usage ratio controllers may have the additional advantage that they may be used for different execution units. For example, the same type of usage ratio controller may be used for an execution unit which perform arithmetic calculations and an execution unit which controls memory access.

Independently, controlling the usage ratios of a plurality of execution units and determining an application performance dependency on the respective usage ratios may allow for identifying a bottleneck of the processor core limiting a given application's performance.

The usage ratio controller 130 may include a feedback shift register 132 and an AND-gate 131 for providing the modified ready signal R*. The AND-gate 131 receives at a first input the ready signal R and a gating signal G transmitted by the feedback shift register 132 at a second input. The feedback shift register 132 may shift with every clock cycle of the first exemplary processor core 100. Feedback shift registers and AND-gates may be very easy to implement in integrated circuits. In particular, feedback shift registers and AND-gates may require very little space on a semiconductor die. The feedback shift register 132 may be an n-bit feedback shift register. The feedback shift register 132 may be preloaded at initialization time with a number of j zeros ("0") and a number of k ones ("1"), where the sum of j and k equals n. The relation between j (or k) and n may determine the proportion of clock cycles the usage ratio controller 130 will mask the ready signal R. The number n of bits of the feedback shift register 132 may determine how fine this proportion may be selected. For example, the length of the feedback shift register 132 may be shorter than 100 bits, in particular shorter than 50 bits, and longer than 5 bits, in particular 10 bits.

Figure 3:
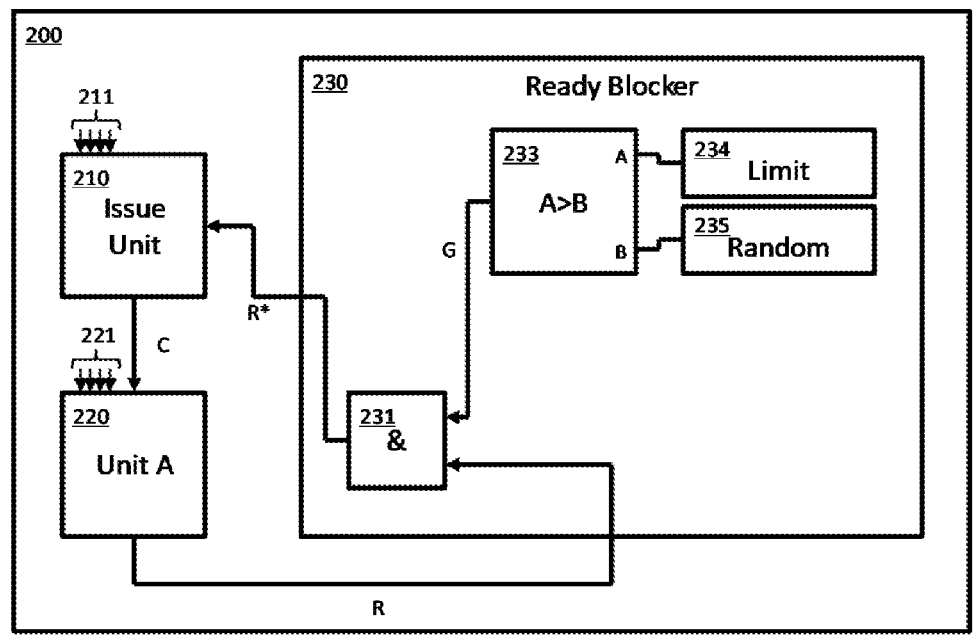
FIG. 3 depicts a second exemplary processor core, according to an embodiment of the present disclosure.

Referring now to FIG. 3 a second exemplary processor core 200 including an issue unit 210 with inputs 211, an execution unit 220 with inputs 221 and a usage ratio controller unit 230 is shown, according to an embodiment of the present disclosure. Concerning the interaction of issue unit 210, inputs 211, execution unit 220, inputs 221 and usage ratio controller unit 230 with each other, reference is made to the explanations above for the first exemplary processor core 100 of FIG. 2 and its corresponding elements: issue unit 110, further inputs 111, execution unit 120, further inputs 121 and usage ratio controller 130.

The second exemplary processor core 200 differs from the first exemplary processor core 100 in the inner structure of the usage ratio controller unit 230. The usage ratio controller unit 230 includes an AND-gate 231 like the usage ratio controller 130 includes the AND-gate 131, and both AND-gates 131, 231 receive at a first input the ready signal R from the respective execution unit 120, 130 and transmit a modified ready signal R* to the respective issue unit 110, 210. A comparator 233 compares a random number B received from a random number generator, e.g. a pseudo-random number generator, 235 with a limit A stored in a limit register 234.

The random number generator 235 may generate a random number B between zero and n−1. Correspondingly, the limit register 234 may store a limit A between zero and n−1. Only if the random number B is smaller than the limit A, the comparator 233 will transmit a gating signal G to the AND-gate 231. Generating the gating signal based on a random number may avoid generating regular beats within the electrical circuits of the processor core which may have unexpected side effects.

Figure 4:
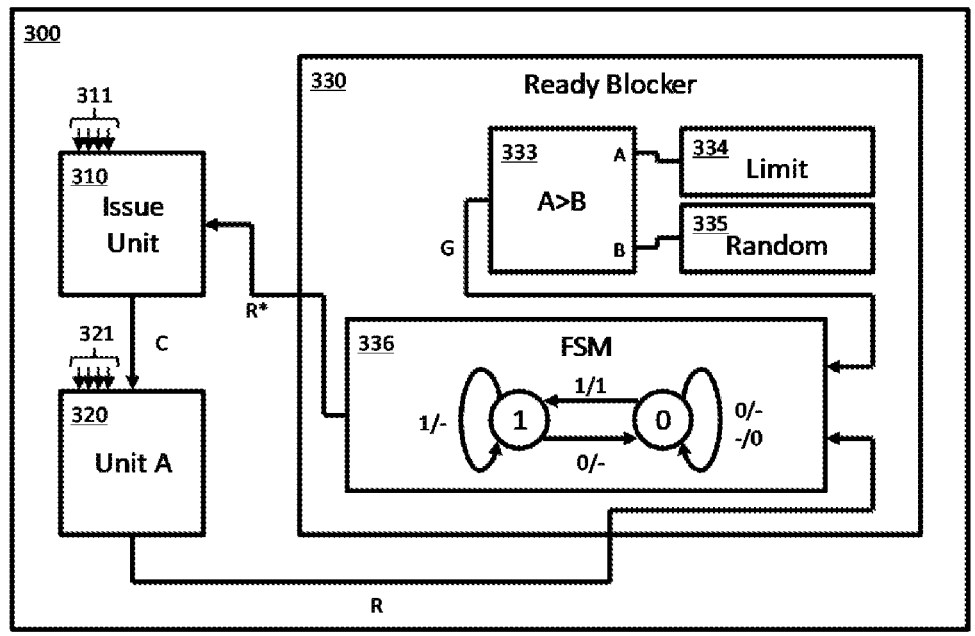
FIG. 4 depicts a third exemplary processor core, according to an embodiment of the present disclosure.

Referring now to FIG. 4, a third exemplary processor core 300 including an issue unit 310 with inputs 311, an execution unit 320 with inputs 321 and a usage ratio controller unit 330 is shown, according to an embodiment of the present disclosure. Concerning the interaction of issue unit 310, inputs 311, execution unit 320, inputs 321 and usage ratio controller unit 330 with each other, reference is made to the explanations above for the first exemplary processor core 100 of FIG. 2 and its corresponding elements: issue unit 110, further inputs 111, execution unit 120, further inputs 121 and usage ratio controller 130.

The third exemplary processor core 300 differs from the first exemplary processor core 100 and the second exemplary processor core 200 in the inner structure of the usage ratio controller unit 330. The usage ratio controller unit 330 includes a comparator 333, a limit register 334 and a random generator 335 like the usage ratio controller unit 230 includes the comparator 233, the limit register 234 and the random generator 235. However, the comparator 333 transmits the gating signal G to a finite state machine (FSM) 336 instead of the AND-gate 231.

The finite state machine 336 receives the ready signal R as first input and the gating signal G as second input and transmits its current state, i.e. one or zero, as modified ready signal R*. In case both the ready signal R and the gating signal G are one, i.e. R/G=1/1, the finite state machine 336 enters the state one, i.e. "1". As long as the ready signal R is 1, i.e. R/G=1/-, the finite state machine 336 maintains the state one, i.e. "1". Only when the ready signal R becomes zero, i.e. R/G=0/-, the finite state machine 336 enters the state zero, i.e. "0". As long as either the ready signal R remains zero, i.e. R/G=0/-, or the gating signal G remains zero, i.e. R/G=-/0, the finite state machine 336 remains in the state zero, i.e. "0", which is transmitted to the issue unit 310.

The proposed usage ratio controller unit 330 using the finite state machine 336 may allow for only increasing the usage ratio of the execution unit 320, it will not intersperse additional busy cycles once the FSM is in state 1 and the execution unit 320 is waiting for new commands.

This will improve but not 100% eliminate the issue, that the previous two implementations will intersperse busy cycles no matter how long the execution unit has already been waiting for new commands. Moreover, the random generator 335 may help to avoid the formation of beats.

In an alternative embodiment of the usage ratio controller unit 330, the circuitry including the comparator 333, the limit register 334 and the random generator 335 could also be replaced with a feedback shift register similar to the feedback shift register 132.

Figure 5:
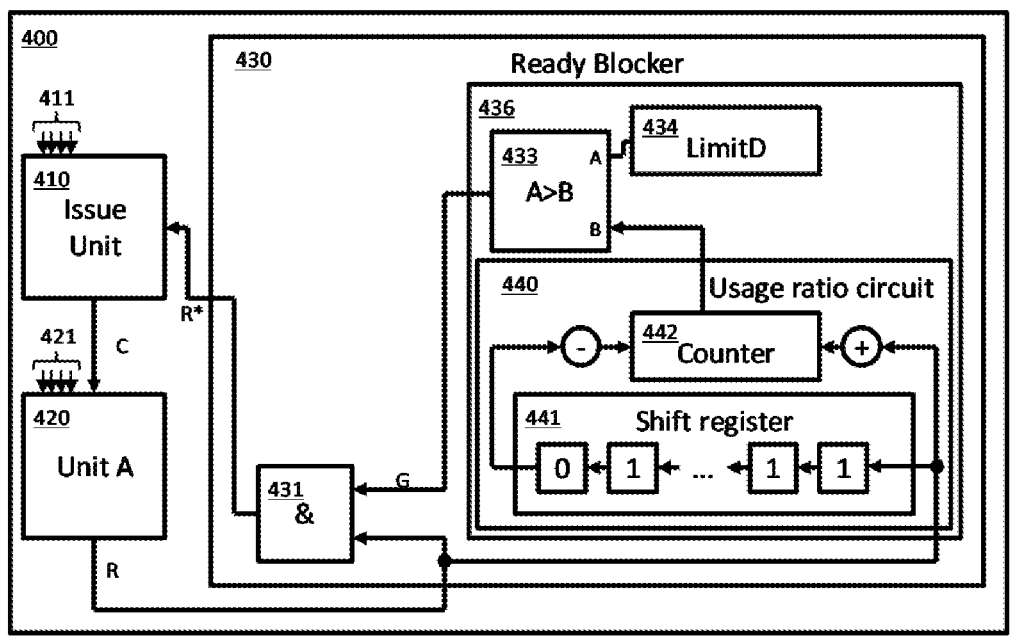
FIG. 5 depicts a fourth exemplary processor core, according to an embodiment of the present disclosure.

Referring now to FIG. 5, a fourth exemplary processor core 400 including an issue unit 410 with inputs 411, an execution unit 420 with inputs 421 and a usage ratio controller unit 430 is shown, according to an embodiment of the present disclosure. Concerning the interaction of these elements: issue unit 410, inputs 411, execution unit 420, inputs 421 and usage ratio controller unit 430 with each other, reference is made to the explanations above for the first exemplary processor core 100 of FIG. 2 and its corresponding elements: issue unit 110, further inputs 111, execution unit 120, further inputs 121 and usage ratio controller 130.

The fourth exemplary processor core 400 differs from the aforementioned exemplary processor cores 100, 200 and 300 in the inner structure of the usage ratio controller unit 430. The usage ratio controller unit 430 includes an AND-gate 431 like the usage ratio controller units 130 and 230 include AND-gates 131 and 231, respectively. Similar to the AND-gates 131 and 231, the AND-gate 431 receives at a first input the ready signal R from the respective execution unit 420. In addition, the AND-gate 431 receives at a second input a gating signal G from a usage ratio limiter 436.

The usage ratio limiter 436 includes a usage ratio circuit 440 measuring the recent usage ratio of the execution unit 420. The usage ratio circuit 440 includes a shift register 441 receiving the ready signal from the execution unit 420 and a counter 442. The counter receives at a first input a signal from the shift register 441, which decrements the value stored in the counter 442, and at a second input the ready signal R from the execution unit 420, which increments the value stored in the counter 442. The counter 442 may count the number of "ones" in the shift register 441. In an alternative embodiment, a usage ratio circuit may be used for a plurality of N execution units. The N execution units may correspond to multiple instances of the same execution unit. In that case the usage ratio circuit may receive a number of N ready signals R from the N execution units. Instead of shifting in/adding "0" and "1" as described hereinbefore, the number of ready signal R being "1" would be shifted in/added.

The value stored in the counter 442 may be indicative of the usage ratio of the execution unit 420. A comparator 433 compares the value transmitted by the counter 442 with a limit stored in a limit register 434. If the usage ratio is larger than the desired usage ratio, the comparator 433 transmits the gating signal G to the AND-gate 431.

The limit stored in the limit register 434 and the number of bits of the shift register 441 may determine a maximum desired usage ratio of the execution unit. The greater the number of bits of the shift register the finer is the granularity of the usage ratio limiter 436 and the longer is the measurement window. For example, the number of bits of the shift register may amount to 5 to 100 bits, in particular from 10 to 50 bits.

Measuring a recent actual usage ratio of the execution unit may allow for extending the apparent usage ratio only when the recent actual usage ratio is already relatively high. Increasing the usage ratio of an already heavily used execution unit may allow for a better detection whether a heavily used execution unit really represents a bottleneck for the given application's performance.

Figure 6:
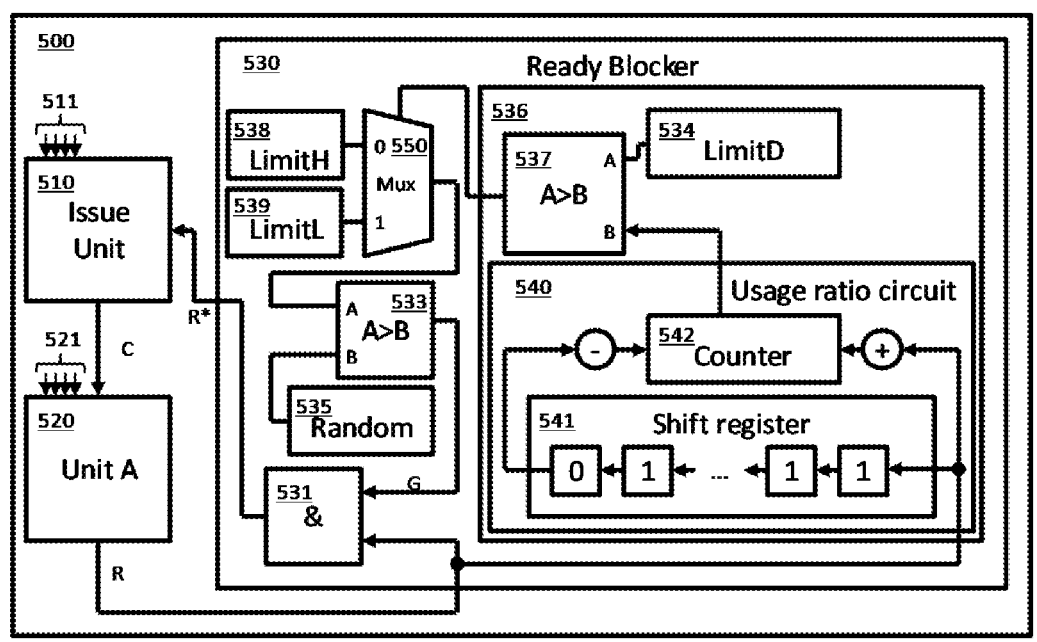
FIG. 6 depicts a fifth exemplary processor core, according to an embodiment of the present disclosure.

Referring now to FIG. 6, a fifth exemplary processor core 500 including an issue unit 510 with inputs 511, an execution unit 520 with inputs 521 and a usage ratio controller unit 530 is shown, according to an embodiment of the present disclosure. Concerning the interaction of these elements: issue unit 510, inputs 511, execution unit 520, inputs 521, and usage ratio controller unit 530 with each other, reference is made to the explanations above for the first exemplary processor core 100 of FIG. 1 and its corresponding elements: issue unit 110, further inputs 111, execution unit 120, further inputs 121 and usage ratio controller 130.

The usage ratio circuit 540 corresponds to the usage ratio circuit 440 and also includes a shift register 541 and a counter 542. In particular, the usage ratio circuit 540 may also be modified to be used for a plurality of execution units as described above.

A multiplexer 550 receives the signal from usage ratio limiter 536 and depending on its value transmits either the higher limit stored in a higher limit register 538 or the lower limit stored in a lower limit register 539 to the comparator 533. The comparator 533 compares the received value with a random number received from a random number generator 535 and transmits the gating signal G depending on the result of the comparison to the AND-gate 531.

The proposed usage ratio controller unit 530 may allow for controlling the usage ratio based on a comparison of the measured usage ratio and a desired usage ratio. If the measured usage ratio is greater than the desired usage ratio, a high probability for transmitting a gating signal may be selected. Vice versa, if the measured usage ratio is smaller than the desired usage ratio, a lower probability for transmitting a gating signal may be selected.

Figure 7:
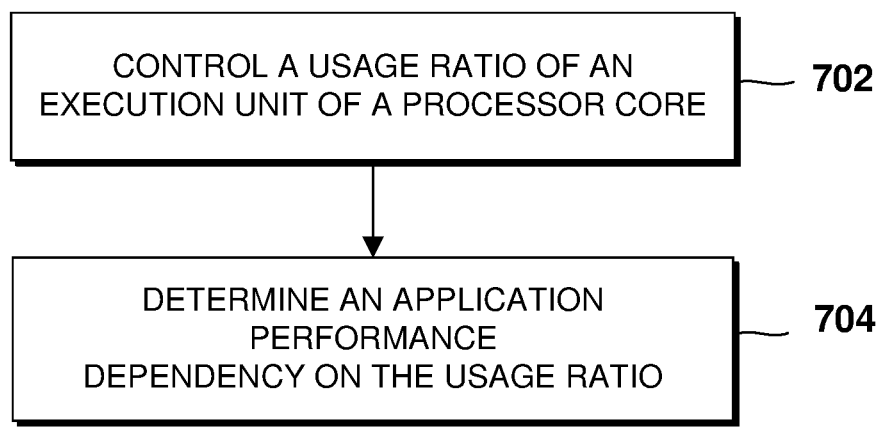
FIG. 7 is a flowchart depicting an exemplary method for detecting a bottleneck in a processor core for a given application, according to an embodiment of the present disclosure.

Referring now to FIG. 7, a flowchart describing the steps of a method for detecting a bottleneck in a processor core for a given application is shown, according to an embodiment of the present disclosure. At step 702, a usage ratio of an execution unit of the processor core is controlled, the execution unit executes a command forwarded to the execution unit. At step 704 an application performance can be measured based on the usage ratio. The usage ratio corresponds to a fraction of a total observation time period during which the execution unit is executing the command.

In some embodiments, an issue unit may be used for forwarding the command to the execution unit based on the modified ready signal. Further, a period during which the ready signal indicates that the execution unit can start executing the command may be limited in some instances.

In other embodiments, the modified ready signal may be generated based on a random signal and the usage ratio be controlled based on a desired usage ratio.

Therefore, embodiments of the present disclosure relates to a processor core including an execution unit, where the execution unit is operable for executing a command forwarded to the execution unit; and a usage ratio controller operatively coupled with the execution unit, the usage ratio controller is operable for controlling a usage ratio of the execution unit, and the usage ratio corresponds to the fraction of the total observation time period during which the execution unit is executing commands.

According to an embodiment, the usage ratio controller is operable for generating a modified ready signal from a ready signal transmitted by the execution unit and the ready signal indicates that the execution unit is ready for receiving the command.

According to another embodiment, the processor core includes an issue unit operable for forwarding the command to the execution unit based on the modified ready signal.

In another embodiment, the usage ratio controller includes a usage ratio limiter and the usage ratio limiter is operable for limiting a period during which the ready signal indicates that the execution unit can start executing the command.

Pursuant to an additional embodiment, the usage ratio controller includes a shift register for sampling the ready signal generated by the execution unit and circuitry for generating the modified ready signal based on content of the shift register.

According to a further embodiment, the usage ratio controller includes a random generator for generating a random signal and circuitry for generating the modified ready signal based on the random signal.

In an embodiment, the execution unit is a or part of a load-store unit. The execution unit may also be a vector unit and/or a binary-coded decimal unit (BCD unit).

Pursuant to a further embodiment, the execution unit is an arithmetic unit.

Moreover, the disclosure relates to a method for detecting or analyzing a bottleneck in a processor core for a given application including controlling a usage ratio of at least one execution unit of the processor core; and measuring an application performance.

In an embodiment, the method includes generating a modified ready signal from a ready signal transmitted by the execution unit, the ready signal indicates that the execution unit is ready for receiving the command.

According to a further embodiment, the method includes using an issue unit for forwarding the command to the execution unit based on the modified ready signal.

Pursuant to an additional embodiment, the method includes limiting a period during which the ready signal indicates that the execution unit can start executing the command.

In another embodiment, the method further includes generating the modified ready signal based on the random signal.

According to a further embodiment, the method includes controlling the usage ratio based on a desired usage ratio.

Pursuant to another embodiment, the method further includes controlling a second usage ratio of a second execution unit, determining an application performance dependency on the usage ratio of the one execution unit and the second usage ratio of the second execution unit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor core comprising:
   an execution unit for executing one or more commands of an application forwarded to the execution unit; and
   a usage ratio controller unit operatively coupled with the execution unit, the usage ratio controller unit controlling a usage ratio of the execution unit, the usage ratio corresponding to a fraction of a total observation time period during which the execution unit is executing the one or more commands of the application, the usage ratio controller unit generating a modified ready signal from a ready signal transmitted by the execution unit indicating that the execution unit is ready for receiving the one or more commands.

2. The processor core according to claim 1, wherein the processor core comprises an issue unit for forwarding the one or more commands to the execution unit based on the modified ready signal.

3. The processor core according to claim 1, wherein the usage ratio controller unit further comprises:
   a usage ratio limiter.

4. The processor core according to claim 3, wherein the usage ratio limiter limits a period during which the ready signal indicates that the execution unit can start executing the one or more commands.

5. The processor core according to claim 1, wherein the usage ratio controller unit further comprises:
   a shift register for sampling the ready signal generated by the execution unit; and
   a first circuitry for generating the modified ready signal based on content of the shift register.

6. The processor core according to claim 1, wherein the usage ratio controller unit further comprises:
   a random generator for generating a random signal; and
   a second circuitry for generating the modified ready signal based on the random signal.

7. The processor core according to claim 1, wherein the execution unit is an arithmetic unit.

8. The processor core according to claim 1, wherein the execution unit is a part of a load store unit, a vector unit, or a binary-coded decimal unit.

9. A computer-implemented method for detecting a bottleneck in a processor core comprising:
   controlling, by a computer, a usage ratio of an execution unit of the processor core, the execution unit executes one or more commands of an application forwarded to the execution unit;
   determining, by the computer, an application performance dependency on the usage ratio, the usage ratio corresponds to a fraction of a total observation time period during which the execution unit is executing the one or more commands of the application; and
   generating a modified ready signal from a ready signal transmitted by the execution unit, the ready signal indicating that the execution unit is ready for receiving the command.

10. The method according to claim 9, further comprising:
    using an issue unit for forwarding the one or more commands to the execution unit based on the modified ready signal.

11. The method according to claim 9, further comprising:
    limiting a period during which the ready signal indicates that the execution unit can start executing the one or more commands.

12. The method according to claim 9 further comprising:
    generating the modified ready signal based on a random signal.

13. The method according to claim 9, further comprising:
    controlling the usage ratio based on a desired usage ratio.

14. The method according to claim 9, further comprising:
    controlling a second usage ratio of a second execution unit; and
    determining an application performance dependency on the usage ratio of the execution unit and the second usage ratio of the second execution unit.

15. A computer system for detecting a bottleneck in a processor core, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    controlling, by a computer, a usage ratio of an execution unit of the processor core, the execution unit executes one or more commands of an application forwarded to the execution unit;
    determining, by the computer, an application performance dependency on the usage ratio, the usage ratio corresponds to a fraction of a total observation time period during which the execution unit is executing the one or more commands of the application; and
    generating a modified ready signal from a ready signal transmitted by the execution unit, the ready signal indicating that the execution unit is ready for receiving the one or more commands.

* * * * *